United States Patent [19]

Noda

[11] 4,120,465
[45] Oct. 17, 1978

[54] FISHING REEL

[75] Inventor: Hideo Noda, Sakai, Japan

[73] Assignee: Shimano Industrial Company Limited, Osaka, Japan

[21] Appl. No.: 821,815

[22] Filed: Aug. 4, 1977

[30] Foreign Application Priority Data

Aug. 13, 1976 [JP] Japan .......................... 51/108907[U]

[51] Int. Cl.² ...................... A01K 89/01; A01K 89/02
[52] U.S. Cl. ................... 242/84.2 A; 242/219
[58] Field of Search ...................... 242/84.2 A, 84.2 R, 242/84.2 C, 84.2 D, 84.2 F, 84.2 H, 84.2 G, 84.21 A, 219

[56] References Cited

U.S. PATENT DOCUMENTS

| 2,767,935 | 10/1956 | Fowler | 242/84.2 F |
| 2,828,088 | 3/1958 | Denison et al. | 242/84.2 A |
| 3,167,272 | 1/1965 | Frode | 242/219 |
| 3,222,010 | 12/1965 | Borgström et al. | 242/84.2 A |
| 3,223,347 | 12/1965 | Clark | 242/84.2 A |
| 3,297,275 | 1/1967 | Sarah | 242/84.2 A |

FOREIGN PATENT DOCUMENTS

558,986 6/1958 Canada .............. 242/84.2 R

Primary Examiner—Billy S. Taylor
Attorney, Agent, or Firm—Stevens, Davis, Miller & Mosher

[57] ABSTRACT

A fishing reel, whose rotary shaft with a rotary frame is directed rectangularly with respect to a handle shaft at a reel body, is mounted at the reel body to a fishing rod through a mounting leg in such a manner that the center line of the rotary frame extends to be substantially rectangular with respect to the longitudinal direction of the rod, so that a fishing line may be drawn out of a spool toward the tip of rod in relation of being bent substantially rectangularly with respect to the center line of the rotary frame, the rotary shaft being axially movable with respect to a tubular shaft fixed to the reel body and having a control plate and a support for controlling a fishing line guide lever provided at the rotary frame.

4 Claims, 8 Drawing Figures

FISHING REEL

This invention relates to a fishing reel and more particularly to a fishing reel mounted to a fishing rod for winding a fishing line on a spool by operating a handle bar, the fishing reel being usually called the closed face reel.

Generally, this kind of closed face reel is provided with the spool for winding the fishing line thereon and a bowl-like shaped rotary frame having a guide lever for retaining the line to be guided therewith onto the spool, which guide lever is made movable radially of the rotary frame and movable outwardly or inwardly of the side wall of the rotary frame, so that the guide lever may move outwardly to retain the line to be wound on the spool through rotation of the rotary frame, or move inwardly to be drawn out the line freely.

This kind of reel is provided at the rear of the reel body with a control lever by which the guide lever is movable outward or inward, the guide lever being usually operable by the thumb of an angler's hand gripping the fishing rod.

Hence, there has been the problem in that since the angler grips the rod with his fingers other than the thumb, he is hard to handle the rod properly for casting due to his infirm grip, resulting in a difficulty of casting a rig at the end of line accurately toward his desired place, and in that the fishing line drawn out of the spool for casting or free rotation of the rotary frame for a hooked fish, is hard to be retarded by the so-called thumbing.

While, it is preferable for the angler enjoying better fishing and trying to fish a lunker even with a thin line that he can cast a rig at a terminal of reeled line toward his desired place and handle the reel properly to play a hooked fish.

Therefore, the aforesaid thumbing is necessary to be easy and reliable. In other words, the angler can cast the rig accurately toward his desired place by retarding the fishing line drawn out for casting and play a hooked fish by retarding the line to be wound on the spool to result in a big catch even with the thin line. The conventional closed face reel, however, has had no constitution by which the line can be retarded desirably easily and accurately when drawn out of or wound on the spool.

Now, the invention has been designed to dissolve the aforesaid problems. An object of the invention is to provide a fishing reel by which the angler can, while reliably gripping the fishing rod, retard the line easily and reliably by the so-called thumbing when drawn out of the spool, so that he may enjoy himself by better fishing, catch a big fish even with the thin line, and cast the rig at the line terminal accurately to his desired place.

The reel of the invention is characterized in that the reel body is provided with; a handle shaft and a rotary shaft driven therewith, whose axes are rectangularly intersecting with each other; a spool and a rotary frame which are arranged around the spool; a mounting leg which serves to mount the reel to the fishing rod and has a mounting seat face lengthwise extending rectangularly with respect to the axis of the rotary shaft, so that the reel body is mounted to the rod in relation that the axis of rotation of the rotary frame is directed substantially rectangularly with respect to the longitudinal direction of the rod, whereby the line is drawn out of the spool toward the tip of rod while being bent rectangularly with respect to the axis of rotation of the rotary frame; and a control plate and a support provided at the rotary shaft so as to be both controllable to allow a guide lever formed at the rotary frame to move outwardly or inwardly of the rotary frame and allow the line to be desirably retarded when drawn out of the spool.

Hence, by use of the reel of the invention, the angler can control the guide lever with the forefinger of his hand gripping the rod and grip the rod firmly and stably with his other fingers including the thumb, while, the forefinger can retard the line desirably easily and reliably, whereby he can cast the rig at the terminal of line accurately to his optional place and play the hooked fish to be caught, as a result, his fishing becomes more interesting and more catches are expected.

These and other objects and advantages of the invention will be seeen by reference to the description, taken in connection with the accompanying drawings, in which.

In FIGS. 1 to 4, the reference numeral 1 designates a reel body; the numeral 2, a mounting leg for mounting the reel body to a fishing rod R; and the numeral 3, a cover fixed to the reel body.

Figure 1:
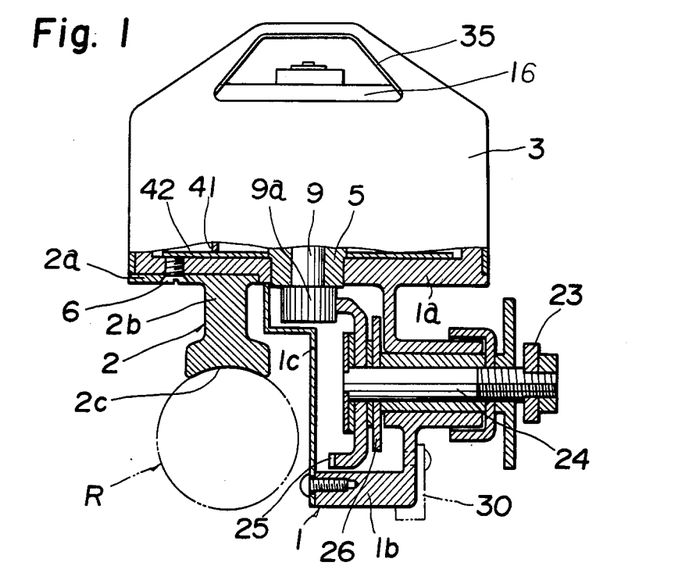
FIG. 1 is a patially cutaway front view of the reel of the invention.
Figure 2:
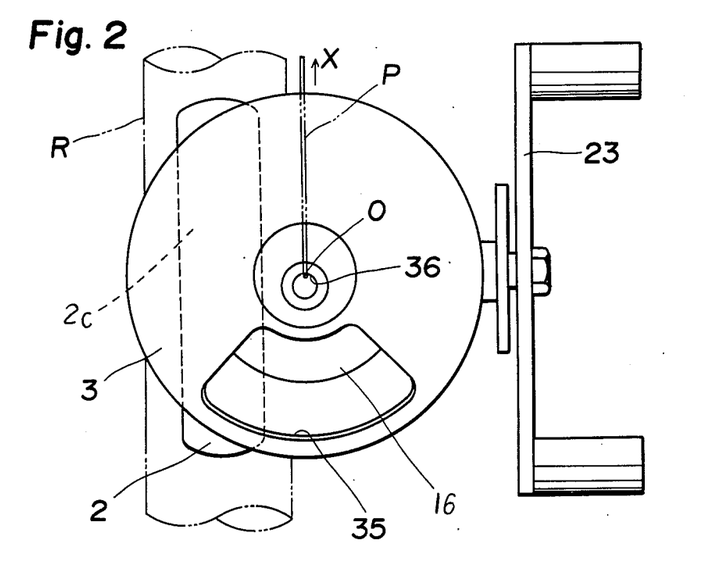
FIG. 2 is a plan view thereof.
Figure 3:
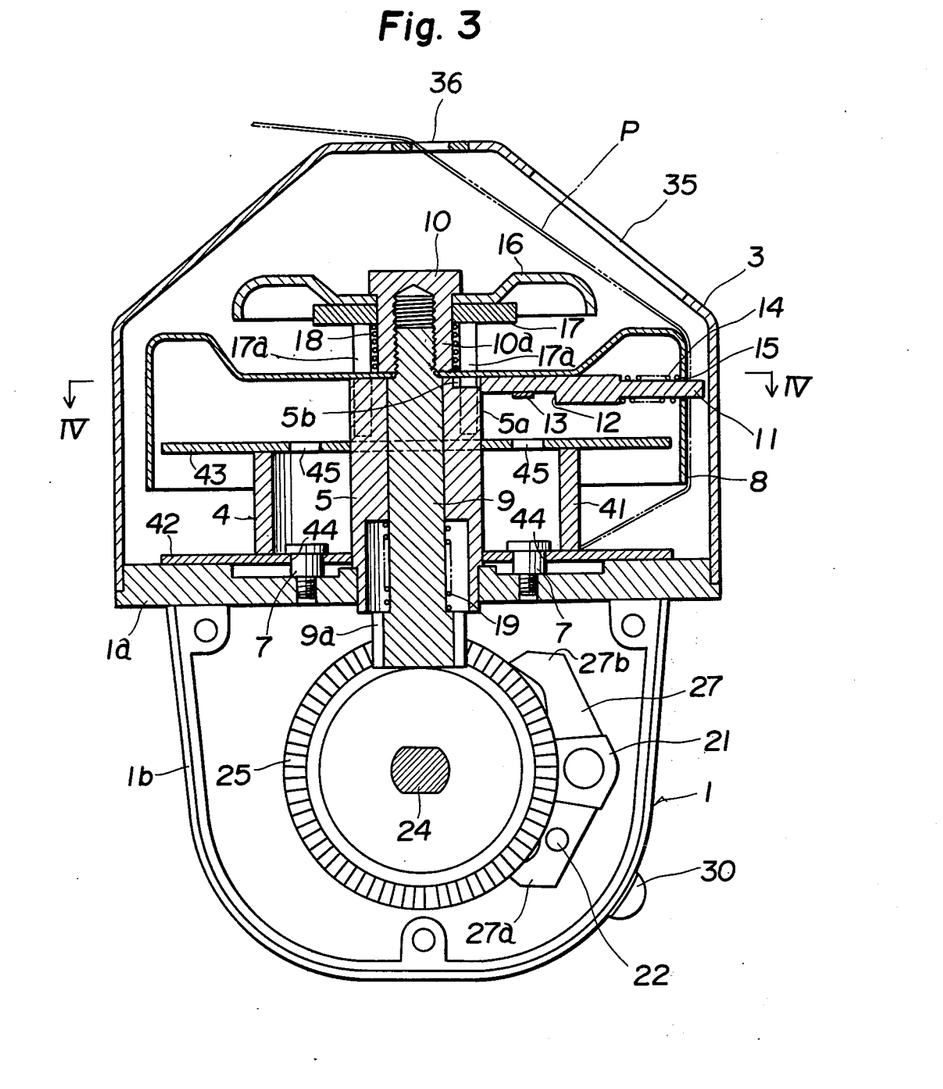
FIG. 3 is a longitudinally sectional side view of the same.

The reel body 1 is, as shown in FIGS. 1 and 3, composed of a disc 1a, a casing 1b extending rectangularly with respect to the flat surface at the rear of the disc 1a, and a lid 1c closing the opening of the casing 1b, the disc 1a having at a substantially central portion thereof a through hole into which a tubular shaft 5 is fixed. The tubular shaft 5 supports therewith a rotary shaft 9 rotatably and axially movable. The casing 1b carries a handle shaft to be hereinafter described in the direction rectangular to the axis of the rotary shaft 9 and has a transmission housed within the casing to transmit the rotation of the handle shaft 24 to the rotary shaft 9. The mounting leg 2, which is provided with a base 2a, a trunk 2b and a mounting seat face 2c, is detachably fixed at the base 2a to the one side rear surface of the disc 1a through a screw 6, the trunk 2b extending from the face 2c axially of the rotary shaft 9 to have the mounting seat face 2c formed at the utmost end of the trunk and of a given length lengthwise of the rod R. The mounting seat face 2c is extending to be substantially rectangular with respect to the axis of the rotary shaft 9 so that the reel body 1 may be mounted to the rod R through the mounting leg 2 in relation that the axis of rotation of the rotary shaft 9 is directed vertically with respect to the direction of the length of the rod R.

Also, to the disc 1a at the reel body 1 is attached a cover 3 for covering a spool and a rotary frame to be both hereinafter described. The cover 3 has a well-known through hole 36 for the fishing line. The through hole 36, when the reel body 1 is mounted to the rod R, has the center line extending in parallel to the axis of rotation of the rotary shaft 9 to be substantially rectangular with respect to the longitudinal direction of the fishing rod R so that the line P may be drawn out through the hole 36 toward the tip of rod in relation of being bent substantially rectangularly with respect to the center line of the through hole 36, i.e., the axis of rotation of the rotary frame 8.

In addition, the cover 3, which is formed in a cup-like shape with a conical fore part, is detachably mounted to the disc 1a, and is provided at the top of the conical fore part with the aforesaid through hole 36 and at the lateral side of the conical part with a window 35 through which the angler can insert his forefinger into the cover 3.

Figure 4:
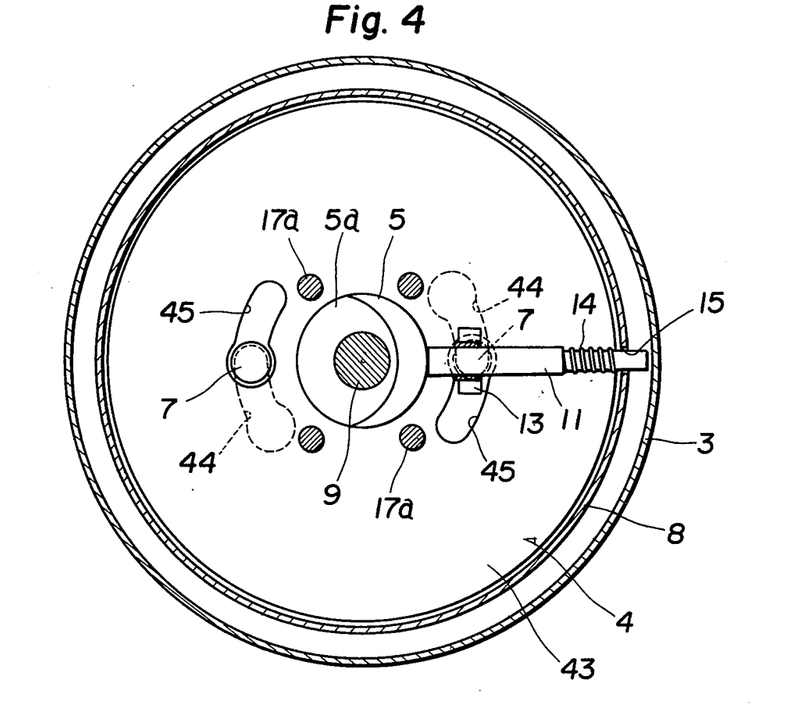
FIG. 4 is a partially omitted cross section taken on Line IV—IV in FIG. 3.

Next, the spool 4, rotary frame 8, and the transmission for transmitting the rotation of the handle shaft 24 to the rotary shaft 9, which are all housed within the reel body 1, will be detailed as follows:

Firstly, the spool 4, which is sleeved onto the tubular shaft 5 and fixed to the disc 1a so as to be desirably turned upside-down, comprises a drum 41 and a pair of discs 42 and 43 formed larger in each diameter than the drum 41 and secured to both sides thereof, the discs 42 and 43 having each pair of arcuate slots 44 and 45 as shown in FIG. 4 respectively. The spool 4 is fixed to the disc 1a through a pair of headed pins 7 protruded at the disc 1a to be engaged with one of the pairs of the slots 44 and 45. The slots 44 and 45 are each made larger at its one end than the head of each pin 7 so that the pins 7 may be inserted through the enlarged portions to be retained to the slots respectively and the spool 4 is turned in a full length of the slot thereby to be secured to the disc 1a through the retained pins 7 or reversely turned to be removed therefrom. In addition, the spool 4 is optional to be mounted through the disc 42 in contact with the disc 1a as shown in FIG. 3 or through the disc 43 by turning the spool 4 upside-down.

Secondly, the rotary frame 8 for guiding the fishing line to be wound on the spool 4 is formed in a bowl-like shaped cylindrical member enclosed at one end thereof, and is provided at the closed end with a central through hole into which the rotary shaft 9 is inserted at its projection from the tubular shaft 5, and is screwably fixed to the rotary shaft 9 by means of a headed blind nut 10 of an internally threaded tubular portion 10a, thereby being rotatable together with the rotary shaft 9.

The rotary frame 8 also supports a fishing line guide lever 11 therewith through a holder 13 in relation of being movable radially of the rotary frame 8 along the inner surface of the closed end thereof as shown in FIG. 3.

The guide lever 11 is provided at its lengthwise intermediate portion with a stepped portion, and between the stepped portion and the inner surface of the cylindrical side wall of the rotary frame 8 is inserted a coil spring 14 by which the guide lever 11 is in normal urged toward the center of the rotary frame 8, so that the tip of the guide lever 11 may, as shown in FIG. 3, come out from the side wall through a hole 15 formed thereat. In addition, another stepped portion 12 is formed at the substantially intermediate portion lengthwise of the guide lever 11 to be engaged with the holder 13 for restricting the guide lever 11 from further moving toward the center of the rotary frame urged by the spring 14.

On the other hand, the rotary shaft 9 supports at its utmost end a disc-like shaped control plate 16 and a support 17 through the tubular portion 10a of the nut 10 in relation of being axially movable, and between the support 17 and the rotary shaft 8 is inserted a coil spring 18 with which the control plate 16 and the support 17 are in normal urged against the head of the nut 10. The support 17 has four legs 17a arranged around the tubular shaft 5 and extending toward the disc 43 of the spool 4. The legs 17a perforate the closed end of the rotary frame 8 and the tips of the legs are abutted against the disc 43 at a given spaced interval therebetween respectively. Thus, the support 17 is, when moved by pressing the control plate 16, contacted with the disc 43 so as to be restricted from its further moving. In addition, the reference numeral 19 in FIG. 3 designates a coil spring inserted between the rotary shaft 9 and the tubular shaft 5. The spring 19, as shown in FIG. 3, urges the rotary shaft 9 to reach at its shoulder the inner surface of the closed end of the rotary frame 8 in contact with one axial end face of the tubular shaft 5. At one axial end portion of the tubular shaft 5 corresponding to the rear end of the guide lever 11 are formed a round portion 5a and a cam portion 5b, which are in contact with the rear end of the guide lever 11 for restoring the guide lever 11 from its backed position to advance position following the rotation of the rotary frame 8 in such a manner that the guide lever 11 backed by the spring 14 force is shifted at the rear end to the cam portion 5b to be contacted therewith so that the rotary frame 8 rotates to force the guide lever 11 to advance by means of the cam 5b against the spring 14.

Thirdly, the transmission, which transmits the rotation of handle shaft 24 to the rotary frame 8, comprises a master gear 25 and a pinion 9a in mesh therewith, the master gear 25 being fixed to an inner axial end of the handle shaft 24, the pinion 9a being fixed to the other axial end of the rotary shaft 9. At an outer axial end of the handle shaft 24 is attched a handle bar 23 which is operated to rotate the handle shaft 24 so as to allow the rotary shaft 9 to be rotatable through the transmission thereby to make rotatable the rotary frame 8 fixed in the rotary shaft 9.

Figure 5:
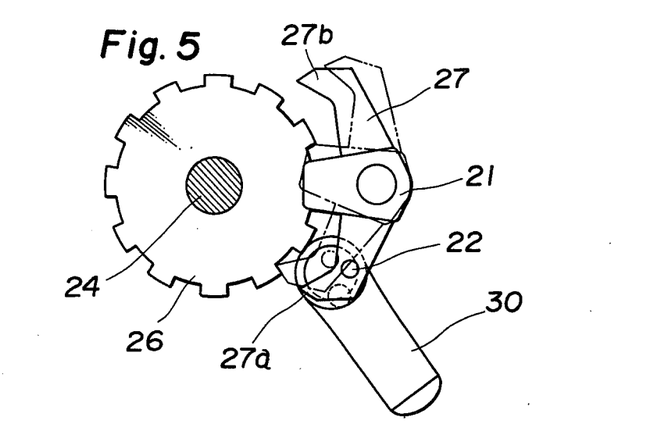
FIG. 5 is an illustration of an anti-reverse gear in connection with pawls engaged therewith.

Also, at the inner axial end portion of the handle shaft 24 is insertably fixed an anti-reverse gear 26 for preventing the rotary shaft 9 from rotating reversely to the winding direction of the line, and within the casing 1b is pivoted thereto a pawl carrier 27 having a pair of pawls 27a and 27b, in mesh with the gear 26 respectively as shown in FIG. 5. The pawl carrier 27, which is meshed through its pawls with the gear 26 to prevent the reverse rotation of the handle shaft 24, is formed to enable each pawl 27a or 27b to be selectively meshed with the gear 26 by means of a control lever 30 attached to the casing 1b.

In addition, in FIG. 5, the reference numeral 21 designates arms in contact with the gear 26, and the numeral 22 designates a pin fixed to the pawl carrier 27 to be engaged with the lever 30.

Figure 8:
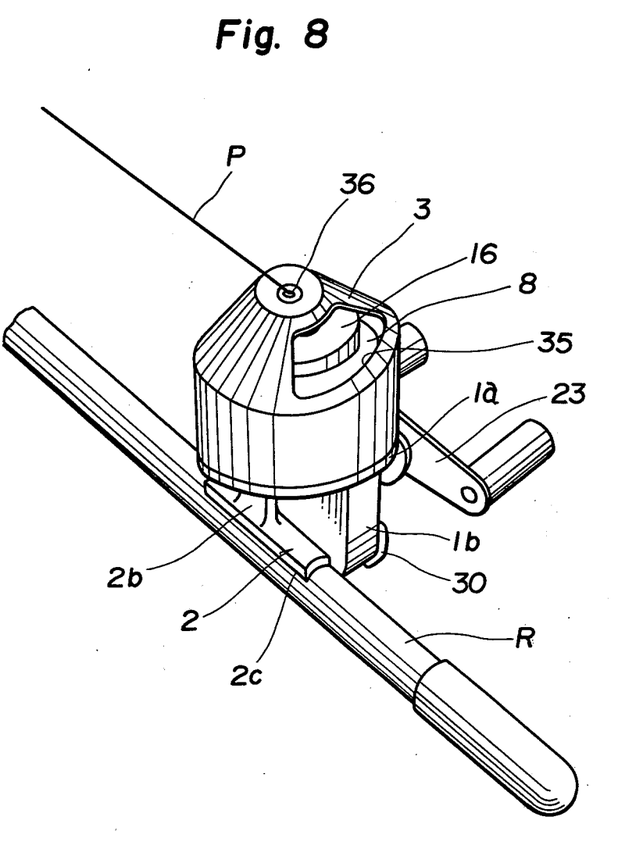
FIG. 8 is a perspective view of the reel when in use.

The reel of the invention constructed as aforegoing, is mounted to the rod R through the mounting leg 2 as shown in FIG. 8 at the following four positions depending on the angler's desire, that is, a first position in FIG. 8, where the reel body 1 is located above the rod R and the handle bar 23 at the right hand when the angler grips the rod R by his hand for fishing; a second position where the reel body above the rod R and the handle bar 23 at the left hand; a third position where the reel body is located below the rod R and the handle bar 23 at the right hand; and a fourth position where the reel body below the rod R and the handle bar 23 at the left hand. Each of the four positions is selective as he likes by turning the spool 4 upside-down, switching each pawl 27a or 27b to be meshed with the gear 26, or turning the cover 3 from side to side to be mounted to the disc 1a.

Figure 6:
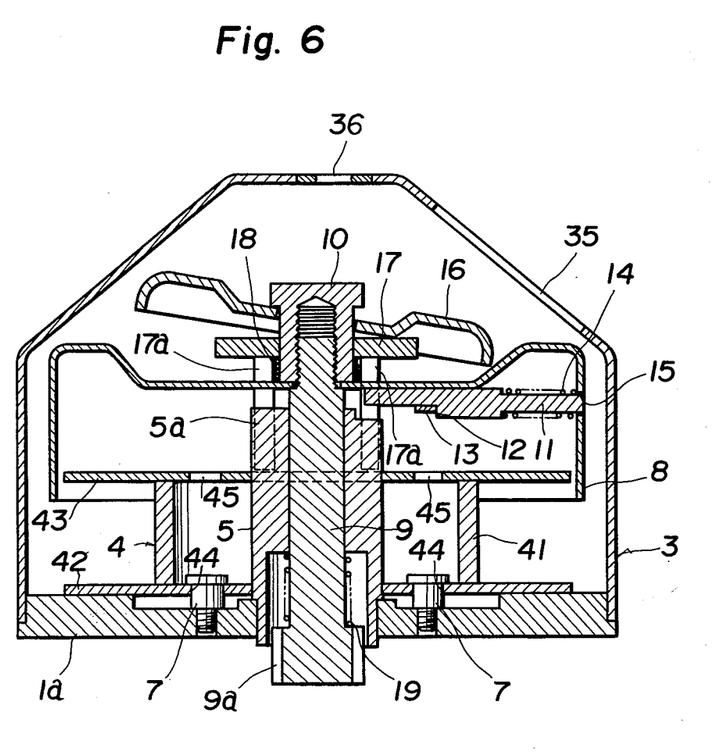
FIGS. 6 and 7 are sectional views of the reel in action.

The angler, when casting, inserts the forefinger of his hand gripping the rod R into the cover 3 through the window 35, presses the control plate 16 against the spring 18, and moves the support 17 toward the rotary frame 8 through the control plate 16, hence, the support 17 is, as shown in FIG. 6, abutted at its legs 17a against the disc 43 of the spool 4 so as to be restricted from further moving, and thereafter the control plate 16 is, when pressed, allowed to swing at the support 17 as the fulcrum so that the rotary shaft 9 may be moved together with the rotary frame 8 toward the through hole 36 at the cover 3 through the head of the nut 10 screwed with the rotary shaft 9, whereby the closed end of the rotary frame 8 leaves the end face of the tubular shaft 5. Hence, the rear end of the guide lever 11 abutting against the round portion 5a, falls into a space formed between the tubular shaft 5 and the rotary frame 8 so as to be moved radially inward by the spring 14 force, thereby releasing the line from being retained by the guide lever, resulting in that the line becomes free and is simultaneously retarded by the angler's finger pressing the control plate 16. The angler, while casting under these conditions, releases his finger from the control plate 16 thereby to cast the rig at the terminal of line to his desirable place. At this time, the line is drawn out of the spool 4 through between the control plate 16 and his finger so as to be retarded and also desirably adjustable by changing the spaced interval therebetween, thereby carrying out the so-called thumbing.

Figure 7:
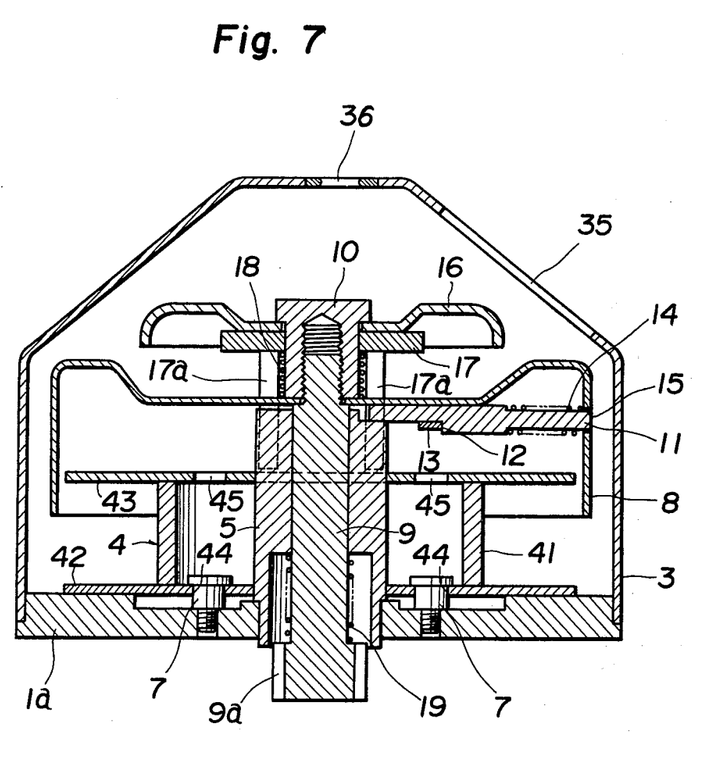

On the other hand, when the line with a hooked fish is to be wound on the spool 4, the handle bar 23 is operated to rotate the rotary frame 8 so as to allow the guide lever 11 to be protruded from the side wall of the rotary frame 8. In detail, the guide lever 11 backed while casting as aforegoing is, as shown in FIG. 7, sandwiched at the rear end thereof between the end face of the tubular shaft 5 and the inner surface of the closed end of the rotary frame 8 due to releasing the control plate 16 from being pressed. In this instance, when the handle bar 23 is operated to rotate the rotary frame 8, the guide lever 11 rotatable together therewith is brought into contact at its rear end with the cam portion 5b so as to advance against the spring 14, thereby again riding on the surface of the round portion 5a as shown in FIG. 3, thus being kept to be protruded from the side wall of the rotary frame 8. Thereafter, the line is caught by the guide lever 11 rotating following the rotary frame 8 and is guided onto the spool 4 through the guide lever 11 for properly fishing. On the other hand, when the hooked fish tugs too heavily, the control plate 16 is immediately released from being pressed, and the line is released from the tip of the guide lever 11 to be drawn out from between the control plate 16 and the angler's finger by being retarded to play the hooked fish properly, thereby preventing the line from being cut.

As seen from the aforesaid description, the reel of the invention has the control plate for controlling the guide lever rotatable together with the rotary frame to be moved back and forth with respect thereto, the control plate being manipulatable by the forefinger of the angler's hand gripping the fishing rod. Hence, the angler can grip the rod firmly with his fingers except the forefinger but including the thumb. Accordingly, the casting is not so affected even though the guide lever is controlled to be moved back and forth by the finger of his hand gripping the rod, thereby to carry out the reliable casting, thus, the rig at the line terminal can be cast accurately to the angler's desired place. Furthermore, the reed construction such that the guide lever is movable back and forth through the control plate formed in advance of the rotary frame as aforegoing, enables the angler to desirably retard the line drawn out of or wound on the spool, by use of his finger for controlling the control plate, thereby carrying out the so-called thumbing.

While a preferred embodiment of the invention has been described using specific terms, such description is for illustrative purpose only, and it is to be understood that changes and variations may be made without departing from the spirit or scope of the following claims.

What is claimed is:

1. A fishing reel mounted to a fishing rod for winding a fishing line on a spool by operating a handle bar, said reel comprising:
    a reel body;
    a mounting leg for mounting said reel body to the fising rod;
    a spool fixed to said reel body;
    a rotary frame having a guide lever guiding the fishing line onto said spool;
    a rotary shaft supporting therewith said rotary frame; and
    a handle shaft having a handle bar which is operated to rotate said rotary shaft therewith;
said reel body having a tubular shaft which is fixed thereto and has the axis extending to intersect rectangularly with the axis of said handle shaft, said tubular shaft supporting therewith said rotary shaft in relation of being rotatable and axially movable, said tubular shaft being provided at the outer periphery of the utmost end thereof with a cam portion, said rotary shaft being protruded from the utmost end of said tubular shaft so as to fix said rotary frame at the protrudent portion of said rotary shaft, said mounting leg being mounted to said reel body, said mounting leg having a mounting seat face of a given length in the longitudinal direction of said fishing rod, said mounting seat face being lengthwise extending to be substantially rectangular with respect to the axis of said rotary shaft so that the reel body may be mounted to the fishing rod through said mounting leg in such a manner that the axis of rotation of said rotary frame extends substantially rectangularly with respect to the longitudinal direction of said fishing rod so that the fishing line may be drawn out toward the tip of said fishing rod in relation of being bent substantially rectangularly with respect to the axis of said rotary frame, said rotary frame being formed in a cup-like shape, said guide lever being movable radially of said rotary frame, said guide lever being capable of being protruded from the side wall of said rotary frame, said guide lever having a coil spring inserted between the guide lever and said side wall, said coil spring urging said guide lever radially inward of said rotary frame so that the radially inner end face of said guide lever may be in contact with the outer periphery and cam portion of said tubular shaft, said protrudent portion of the rotary shaft carrying at its utmost end a support and a control plate in relation of being movable axially of said rotary shaft, said support having supporting legs which are extending toward a stationary member fixed to said reel body, said supporting legs being brought into contact with said stationary member when said support is axially moved, thereby to prevent said support from further moving toward said stationary member, said control plate being adapted to be pressed toward said rotary frame for keeping said support stationary thereby to allow said rotary shaft to be axially movable by use of said support.

2. The fishing reel as claimed in claim 1, wherein said stationary member is a spool, and said supporting legs of the support perforate said rotary frame to oppose said spool, so that said support may, when axially moved, be in contact at said legs thereof with said spool, thereby being prevented from axially moving.

3. The fishing reel as claimed in claim 1, wherein said rotary shaft is provided at its one axial end with a screw thread, said screw thread being screwed with a headed nut with a tubular body so that said rotary frame may be fixed to said rotary shaft through said nut, said tubular body supporting at the outer periphery thereof said support and control plate in relation of being movable axially of said rotary shaft.

4. The fishing reel as claimed in claim 1, wherein said reel body is provided with a cover of a cup-like shape for covering therewith said spool, rotary frame, support and control plate, said cover being provided at the front portion thereof with a through hole through which the fishing line passes and at the side portion with a window through which said control plate is controllable.

* * * * *